United States Patent
Reuter

(10) Patent No.: US 7,154,660 B2
(45) Date of Patent: Dec. 26, 2006

(54) TESTING OF SPATIAL LIGHT MODULATORS (SLM)

(75) Inventor: Fred J. Reuter, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/134,972

(22) Filed: May 23, 2005

(65) Prior Publication Data

US 2006/0262381 A1    Nov. 23, 2006

(51) Int. Cl.
*G02B 26/00* (2006.01)
*G01N 21/55* (2006.01)
(52) U.S. Cl. .................... 359/291; 356/445
(58) Field of Classification Search ........ 356/445, 356/447; 359/448, 291, 292
See application file for complete search history.

(56) References Cited

U.S. PATENT DOCUMENTS 6,788,416 B1 * 9/2004 Reuter .............. 356/445
6,831,750 B1 * 12/2004 Mehrl et al. ........... 356/614
6,922,483 B1 * 7/2005 Doane .................... 382/149

* cited by examiner

*Primary Examiner*—David N. Spector
(74) *Attorney, Agent, or Firm*—Charles A. Brill; Wade James Brady, III; Frederick J. Telecky, Jr.

(57) ABSTRACT

System and method for correlation testing of SLMs using stroboscopic methods. A preferred embodiment comprises providing a test pattern to the SLM, configuring a pulsed light source to emit a short duration light pulse at a specified time, instructing the SLM to display the test pattern, emitting the short duration light pulse at the specified time, computing a correlation image based upon light reflected by the SLM, and determining the SLM's performance based upon the correlation image. The pulse of light permits the testing of dynamic and static characteristics of the SLM, while the use of optical computational units in the computation of the correlation image greatly reduces computational requirements and testing time.

23 Claims, 5 Drawing Sheets

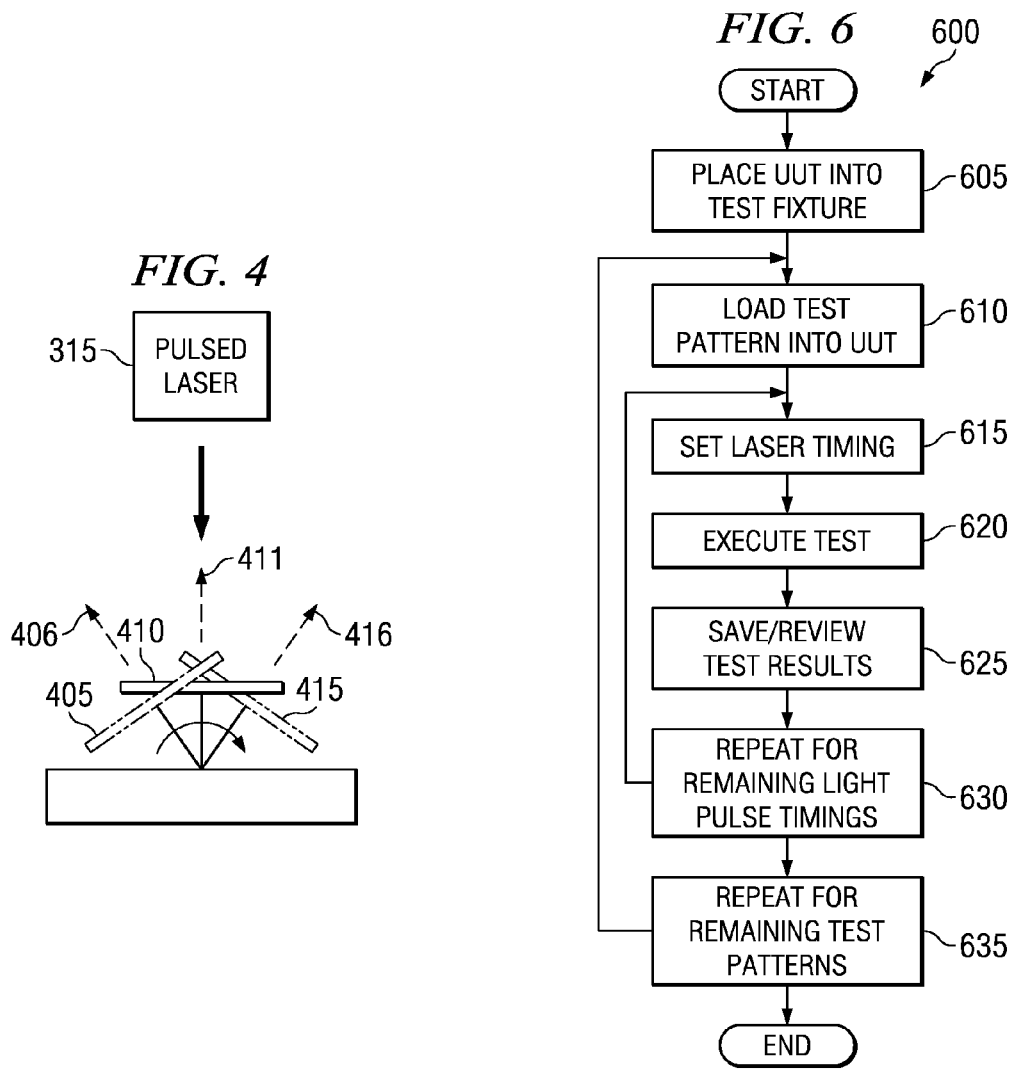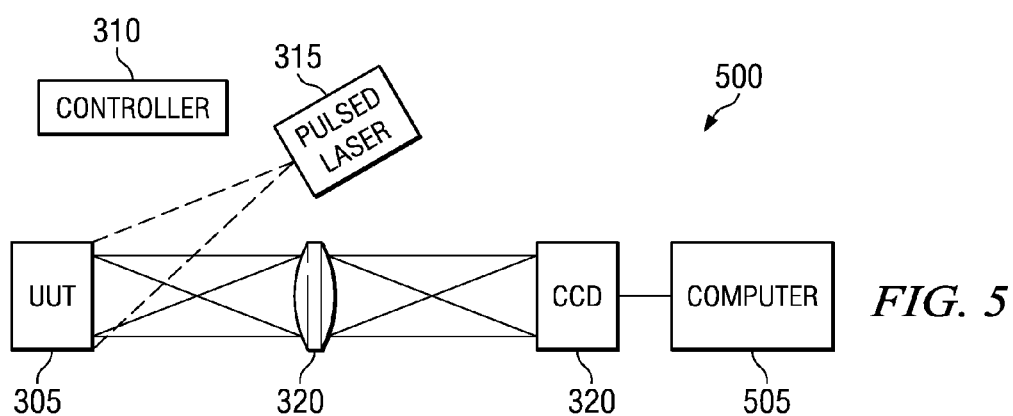

TESTING OF SPATIAL LIGHT MODULATORS (SLM)

TECHNICAL FIELD

The present invention relates generally to a system and method for video display systems, and more particularly to a system and method for correlation testing of SLMs using stroboscopic methods.

BACKGROUND

A single SLM, such as a digital micromirror device (DMD) may have up to several million light modulators made from movable (or deformable) mirrors. Even with modern fabrication techniques and facilities, with such a large number of mechanical devices, it is likely that an SLM will have a few faulty light modulators. It is therefore imperative that SLMs be tested for proper function before they leave the factory so that improperly operating SLMs are not released for sale.

One commonly used prior art technique to test SLMs is to place an SLM into a test fixture, configure it to display a series of test images, and have a test operator evaluate the quality of the test images. The test operator can then determine if the SLM is operating properly based on the evaluation of the test images. The prior art technique can be extended by having the SLM display a test video clip and having the test operator determine the function of the SLM with respect to displaying motion pictures.

One disadvantage of the prior art that the qualitative evaluation of the image quality of the SLM by a test operator is a slow and potentially error-ridden process. The use of test operators to determine whether an SLM is functioning properly or not can lead to long test times, which can dramatically reduce the number of SLMs that can be tested. Additionally, the use of test operators can greatly increase testing costs. Furthermore, since the evaluation is a qualitative evaluation, the test results can be unreliable and difficult to repeat.

A second disadvantage of the prior art is that the test cannot measure dynamic characteristics of the SLMs, such as the synchrony of the operation of the mirrors, which mirrors are switching too fast or too slow, and so forth. Since the mirrors in the SLM switch on the order of microseconds, their operation is typically invisible to the test operators. While the dynamic characteristics are difficult to evaluate, they play an important role in the quality of the image produced by the SLMs.

SUMMARY OF THE INVENTION

These and other problems are generally solved or circumvented, and technical advantages are generally achieved, by preferred embodiments of the present invention which provides a system and method for correlation testing of SLMs using stroboscopic techniques.

In accordance with a preferred embodiment of the present invention, a method for determining the performance of a spatial light modulator is provided. The method includes instructing light modulators in the spatial light modulator to assume a specified state, emitting a short duration light pulse at a specified time, and computing a correlation image based upon light reflected from the light modulators in the spatial light modulator. The method also includes evaluating the correlation image to determine the performance of the spatial light modulator.

In accordance with another preferred embodiment of the present invention, a method for testing the performance of a spatial light modulator is provided. The method includes providing a test pattern to the spatial light modulator, configuring a pulsed light source to emit a short duration light pulse at a specified time, and then instructing the spatial light modulator to display the test pattern. The method also includes emitting the short duration light pulse at the specified time, and computing a correlation image based on light reflected by the spatial light modulator. The correlation image can them be used to determine the performance of the spatial light modulator.

In accordance with another preferred embodiment of the present invention, a system for testing spatial light modulators is provided. The system includes a pulsed light source that is configured to emit a short duration coherent light pulse at a specified time onto a unit under test (UTT) and a lens, located a fixed distance away from the UUT, converts an image formed from light reflecting from the UUT into a spatial frequency domain representation of the image. The system also includes a sensor, located a fixed distance away from the lens, which converts the spatial frequency domain representation of the image into electrical signal. Finally, a computational unit that is connected to the sensor computes a magnitude and a square-root of the electrical signals.

An advantage of a preferred embodiment of the present invention is that the use of stroboscopic techniques can enable the quantitative evaluation of the SLM under test using solely test equipment. Therefore, the tests can be performed faster and at less cost. This can reduce the overall manufacturing cost of the SLM. Furthermore, since test equipment is used in the testing, the test results are reliable and can be readily repeated.

Yet another advantage of a preferred embodiment of the present invention is the use of stroboscopic techniques can permit the dynamic testing of the SLM under test. Dynamic testing can allow the transient performance of the SLM to be evaluated.

A further advantage of a preferred embodiment of the present invention is that with the use of optical computing techniques, operations that would normally require a significant processing power can be completed almost instantaneously and without the use of current-based computers with a large amount of processing power, thereby further reducing the testing time and cost.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a diagram of the use of a short duration light pulse from a pulsed laser to capture dynamic information about the performance of an SLM, according to a preferred embodiment of the present invention;

FIG. 5 is a diagram of a test system for use in testing an SLM using optical and current-based computational units, according to a preferred embodiment of the present invention;

FIG. 6 is a diagram of an algorithm for testing the performance of an SLM, according to a preferred embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an SLM that makes use of positional micromirrors as light modulators. The invention may also be applied, however, to other SLMs that make use of mirrors as light modulators, such as SLMs using deformable mirrors. Furthermore, the invention can be applied to SLMs using other technologies, such as liquid-crystal display (LCD) and liquid-crystal on CMOS (LCOS) technologies.

A cross-correlation image (or simply, correlation image) is an image that illustrates the correlation between two images (or two portions of a single image). The more similar the two images, the greater a magnitude of a correlation spike. To compute a correlation image, the two images can be convolved together. It may be simpler to multiply spatial frequency domain versions of the two images than to perform the convolution in the spatial domain, so a Fourier transform may be applied to the two images to perform the conversion into the spatial frequency domain. The result of the multiplication can then be converted back into the spatial domain by an inverse Fourier transform. The correlation image can be a graphical technique to compare two images, a test image and a reference image, wherein the test image can be produced by an SLM under test and the reference image can be produced by a known, good SLM. If the correlation image displays a degree of correlation that exceeds a certain specified threshold, then the SLM under test can be considered as having passed the test.

Figure 1:
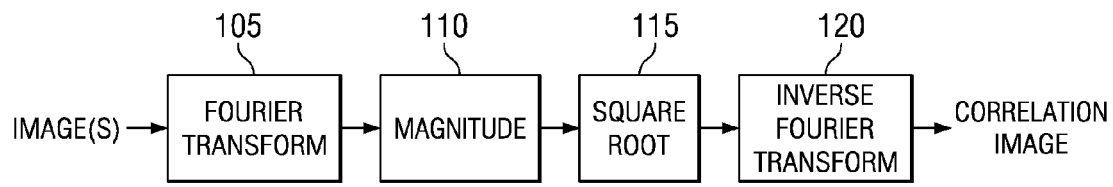
FIG. 1 is a diagram of the computation of a correlation image.

With reference now to FIG. 1, there is shown a diagram illustrating operations used in the computation of a correlation image from an input image(s). A correlation image can be used to provide a numerical result usable in a comparison of two images (a reference image and a test image) or two portions of a single image. If the correlation image shows that there is a high degree of correlation between the two images, then the SLM that generated the test image may be considered as meeting performance requirements.

The correlation image can be computed by first providing the test image and the reference image (or the two portions of a single image) to a Fourier transform unit 105. The Fourier transform unit 105 is responsible for converting the two images into their spatial frequency domain representation. As discussed above, it can be easier to perform a multiplication in the spatial frequency domain than a convolution in the spatial domain, although the two operations can yield the same result. Once the two images have been converted into the spatial frequency domain, they can be provided to a magnitude unit 110. The magnitude unit 110 can return the absolute value (magnitude) of the values provided to it. The absolute values of the spatial frequency domain representation of the two images can then be provided to a square root unit 115, where the square roots of the absolute values are taken, producing a spatial frequency domain version of the correlation image. Finally, an inverse Fourier transform unit 120 converts the spatial frequency domain version of the correlation image back into a time-domain version.

Certain operations, such as the Fourier transform, the inverse Fourier transform, the magnitude operation, and the square root operation, can be computationally intensive when computed using normal current-based computing, especially for large data sets, e.g., the image size. These operations can be performed nearly instantaneously when computed using optical functional units. The speed in which an optical functional unit can perform these operations can be independent of the data set. Therefore, the use of optical functional units can greatly shorten the time between capturing the image data to the production of the correlation image. Optical functional units are considered to be well understood by those of ordinary skill in the art of the present invention and will not be discussed herein.

Figure 2:
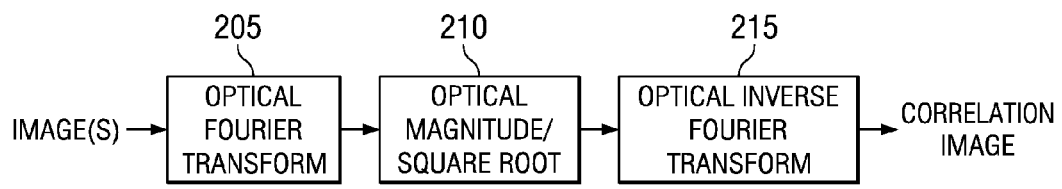
FIG. 2 is a diagram of the computation of a correlation image using optical computational units.

With reference now to FIG. 2, there is shown a diagram illustrating operations used in the optical computation of a correlation image from an input image(s). There is often a one-to-one correspondence between a current-based computational unit and an optical functional unit. When using optical functional units, an optical Fourier transform functional unit 205 can replace the Fourier transform unit 105 (FIG. 1), for example. Some optical functional units can replace more than one current-based computational unit, e.g. an optical magnitude-square root unit 210 can replace the magnitude unit 110 and square root unit 125 (both of FIG. 1). Finally, an optical inverse Fourier transform functional unit 215 can replace the inverse Fourier transform unit 120 (FIG. 1).

Figure 3:
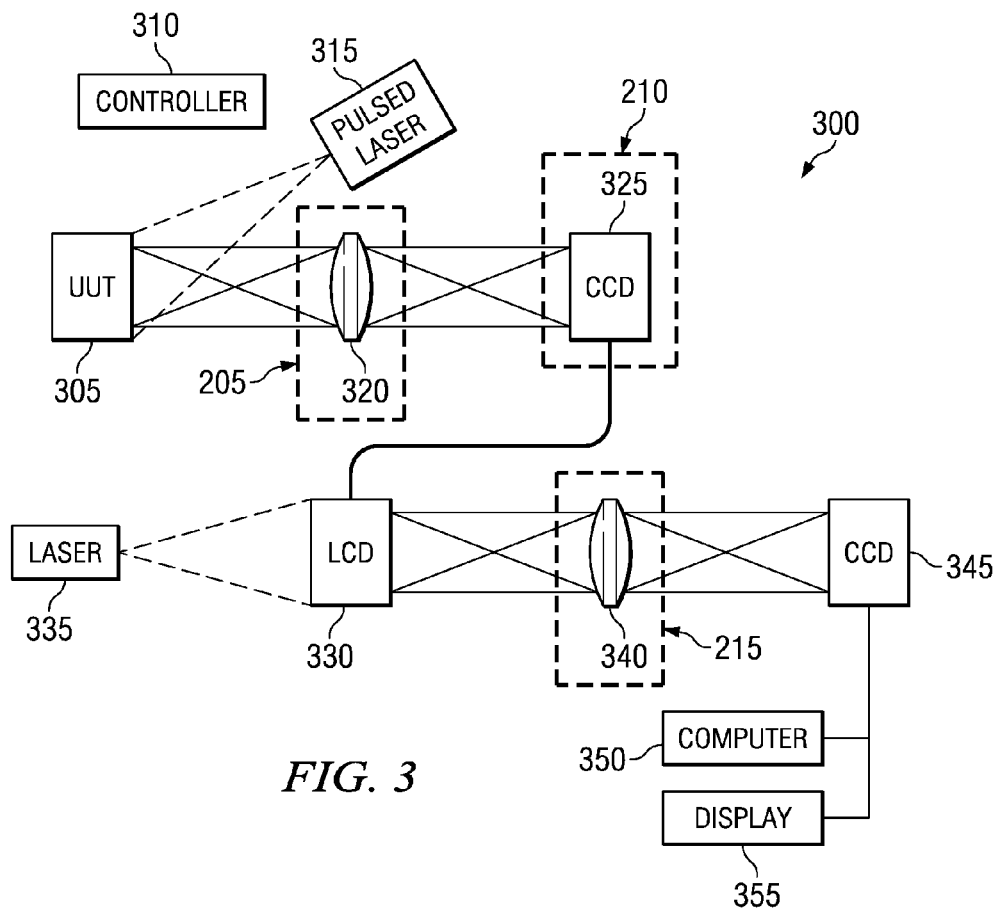
FIG. 3 is a diagram of a test system for use in testing an SLM using optical computational units, according to a preferred embodiment of the present invention.

With reference now to FIG. 3, there is shown a diagram illustrating a test system 300 for testing an SLM using optical computational units, according to a preferred embodiment of the present invention. The test system 300, as shown in FIG. 3, can be used to test the performance of an SLM 305, referred to herein as a unit under test (UUT). The UUT 305 can be tested against a reference unit (also commonly referred to as a golden unit) with known performance characteristics or the UUT 305 can be tested against itself. When tested against the reference unit, the UUT 305 and the reference unit can be configured to display an identical image and a correlation image can be computed from image data taken from both the UUT 305 the reference unit. When tested against itself, the UUT 305 can be configured to display identical images on different portions of its light modulator array. A correlation image can then be computed from the different portions of the light modulator array.

The UUT 305 (the SLM being tested) can be placed in position in the test system 300. Since optical computational units are used, the position of the UUT 305 can be crucial. For example, the position of the UUT 305 can be dependent upon the wavelength of the light used by the optical computational units. If the UUT 305 is to be tested against a reference unit, the reference unit (not shown) can be placed adjacent to the UUT 305 in the test system 300. Once the UUT 305 is in place, the testing can commence with the execution of SLM instructions to display an image on the UUT 305 (and the reference unit if a test comparing the UUT 305 and the reference unit is being performed). The SLM instructions can be executed by a controller 310 or computer (not shown) that is coupled to the test system 300. The controller 310 can be used to coordinate the operation of the test system 300 and perform tasks such as controlling the operation of the UUT 305, controlling the movement of image data, processing the correlation image, and so forth.

At some time after the SLM instructions to display an image are executed, a pulsed laser 315 can be instructed to illuminate the UUT 305, perhaps by the controller 310. According to a preferred embodiment of the present invention, the pulsed laser 315 is used to illuminate the UUT 305 since light produced by the pulsed laser 315 is coherent in nature and the optical computational units used in the test system 300 make use of interference properties of coherent light. The pulsed laser 315 can be programmed to illuminate the UUT 305 (and the reference unit) with a short burst of high-intensity light. If the light produced by the pulsed laser 315 is of inadequate intensity, it can be possible to repeat the execution of the instructions to the UUT 305 and the production of the short light burst until adequate image intensity is achieved.

After illuminating the UUT 305 for the programmed duration, the pulsed laser 315 can turn off. According to a preferred embodiment of the present invention, the amount of time elapsed between the SLM instructions to display an image are executed and the firing of the pulsed laser 315 can be varied so that the laser light can illuminate the UUT 305 and capture an image of the state of the light modulators in the UUT 305. For example, if the light modulators (such as positional mirrors) take about five (5) micro-seconds to move into position after appropriate SLM instructions are executed, and the pulsed laser 315 is programmed to fire after two (2) micro-seconds, then it is possible to capture an image of the state of the positional mirrors in mid-flight. Analysis of the image can then determine if some positional mirrors are slow (or fast).

Light reflected off the UUT 305 (and the reference unit) can be received at a lens 320. The lens 320 can be an optical computational unit that performs a Fourier transform upon light reflected off the UUT 305. The lens 320 is an implementation of the optical Fourier transform unit 205 (FIG. 2). The lens 320 and the UUT 305 should be a specified distance apart, which can be dependent upon specific characteristics of the lens 320, the wavelength of the light emitted from the pulsed laser 315, and so on. Optical output from the lens 320 can be detected by a charge coupled device (CCD) 325. The CCD 325 can optically perform the magnitude and square root operations and is an implementation of the optical magnitude-square root unit 210 (FIG. 2). As in the situation with the UUT 305 and the lens 320, the separation between the CCD 325 and the lens 320 can be dependent upon the characteristics of the lens 320, the light emitted by the pulsed laser 315, and so forth.

Electrical information from the CCD 325 can be representative of the spatial frequency domain version of the correlation image. Since the dynamic state of the UUT 305 has been captured in the electrical information from the CCD 325, the electrical information can be stored for later processing. For example, the electrical information can be stored in a computer coupled to the CCD 325 (computer not shown) for subsequent processing.

Alternatively, the electrical information can receive further processing using optical computing and can be provided to a liquid crystal display (LCD) 330. The LCD 330 can display the image information captured by the CCD 325 and a laser 335 can illuminate the LCD 330 to project the image information. The laser 335 and LCD 330 effectively convert the electrical information from the CCD 325 back into optical information. The laser 335 can be an ordinary laser and does not need to be a pulsed laser like the pulsed laser 315. A second lens 340 can collect the projected light from the LCD 330 and perform optical processing on the projected light. Output from the second lens 340 can be detected on a second CCD 345. The second lens 340 can be used to implement the optical inverse Fourier transform unit 215 (FIG. 2). The CCD 345 can be used to convert image information into electrical information. As discussed previously, the separation between the LCD 330 and the second lens 340 and between the second lens 340 and the CCD 345 can be dependent upon the characteristics of the second lens 340, the wavelength of the light produced by the laser 335, and so on. Output from the CCD 345 (electrical representation of the image information) can be provided to a computer 350, where it can be saved or undergo further processing, displayed on an image display 355 for evaluation purposes, or so on. The output of the CCD 345 is the correlation image.

The computer 350 can save the output of the CCD 345 for later evaluation. Alternatively, the computer 350 may execute a test application program that can make use of the output of the CCD 345 to determine if the UUT 305 is performing within specifications. For example, the computer 350 can evaluate the output of the CCD 345 to determine if a correlation between the image displayed by the UUT 305 matches the image displayed by the reference unit to within a specified tolerance level. If it does, then the UUT 305 can be marked as having passed the test, while if it does not, then the UUT 305 can be marked as having failed the test. The use of the computer 350 can permit full automation of the testing of the UUT 305, which can greatly increase the reliability and repeatability of the testing as well as increasing the speed of the testing.

Providing the output of the CCD 345 to the image display 355 can permit a test operator to review the correlation image produced by the test system 300. The test operator can then make a determination about the performance of the UUT 305. For example, if the correlation image displays an image meeting certain criteria, then the test operator can mark the UUT 305 has having passed the test.

With reference now to FIG. 4, there is shown a diagram illustrating the use of a short duration light pulse from a pulsed laser to capture dynamic information regarding a UUT, according to a preferred embodiment of the present invention. An output pulse of a pulsed laser, such as the pulsed laser 315 (FIG. 3), can be programmed to specify characteristics such as pulse duration, time of pulse, and so on. Therefore, if the pulsed laser 315 is programmed properly, the output can capture the light modulators of a UUT, such as the UUT 305 (FIG. 3), while they are in motion. For example, if it takes approximately five micro-seconds for the light modulators (such as positional mirrors) of the UUT 305 to move into final position after they are given an instruction to move, then if the pulsed laser 315 is programmed to produce three short duration light pulses to occur at various times within five micro-seconds after the instruction to the UUT 305 to move its light modulators, then the short duration light pulses can illuminate the light modulators in mid-flight.

As illustrated in FIG. 4, there are shown three captured images of a single light modulator (positional mirror) as it moves from an initial position (not shown) to a final position (not shown). A first image 405 of the single light modulator is the result of a first short duration light pulse from the pulsed laser 315, wherein the first short duration light pulse is emitted a short amount of time after the light modulator begins to move. A first dashed arrow 406 illustrates light reflected from the light modulator as a result of the first short duration light pulse. A second image 410 of the single light modulator is the result of a second short duration light pulse from the pulsed laser 315, wherein the second short duration light pulse is emitted a short amount of time after the emission of the first short duration light pulse. A second dashed arrow 411 illustrates light reflected from the light modulator as a result of the second short duration light pulse. A third image 415 of the single light modulator is the result of a third short duration light pulse from the pulsed laser 315, wherein the third short duration light pulse is emitted a short amount of time after the emission of the second short duration light pulse. A third dashed arrow 416 illustrates light reflected from the light modulator as a result of the third short duration light pulse.

The amount of light reflected from the light modulator to the lens 320 of the test system 300 (both of FIG. 3) is dependent upon the position of the light modulator. If a light modulator is slower or faster than other light modulators in the UUT 305, then the light at the lens 320 due to the light modulator will be different from the light at the lens 320 due to the other light modulators. It is therefore possible to determine the dynamic behavior of light modulators in the UUT 305 by examining the correlation image(s) for the UUT 305 with the pulsed laser 315 emitting light at specific programmed times.

With reference now to FIG. 5, there is shown a diagram illustrating a test system 500 for testing an SLM using optical computational units, wherein in addition to optical computation units, current-based computational units are used, according to a preferred embodiment of the present invention. The test system 500, as shown in FIG. 5, combines both optical computational units with current-based computational units. The test system 500 includes a UUT 305, controller 310, pulsed laser 315, lens 320, and CCD 325 arranged in a configuration to enable the use of optical computing to perform a Fourier transform of an image displaying the state of light modulators in the UUT 305. This portion of the test system 500 can be similar to the test system 300 (FIG. 3).

However, with the test system 300, the computation of the image data after the Fourier transform continues using optical computational units. With the test system 500, after the computation of the Fourier transform of the image data by the lens 320 and the conversion of the image data back into electrical information by the CCD 325, a computer 505 can be used to compute the remaining computations. The computer 505 can perform the magnitude computation, the square-root computation, as well as the inverse Fourier transform. This can be possible since the time sensitive aspects of the testing (the dynamic testing of the light modulators via the use of the pulsed laser 315) has been completed by the optical computational units. The remaining computations are not as time sensitive and can be performed using conventional current-based computational units with data saved from the CCD 325. As an alternative to the computer 505, specific functional units can be used to perform the needed computations. A magnitude unit, such as the magnitude unit 110 (FIG. 1), can be used to perform the magnitude computation, a square-root unit, such as the square-root unit 115 (FIG. 1), can be used to perform the square-root computation, and an inverse Fourier transform unit, such as the inverse Fourier transform unit 120 (FIG. 1), can be used to perform the inverse Fourier transform computation. A memory or a storage unit (neither shown) may be needed to store data from the CCD 325 as it is being produced to prevent loss of data.

With reference now to FIG. 6, there is shown a diagram illustrating an algorithm for use in the testing of dynamic and static properties of a UUT using optical computational units, according to a preferred embodiment of the present invention. As shown in FIG. 6, the diagram illustrates an algorithm 600 for use in the testing of dynamic and static properties of a UUT. The algorithm 600 can be used in a test system that is fully automated, partially automated, or non-automated. According to a preferred embodiment of the present invention, the algorithm 600 can execute on a controller in a test system, such as the controller 310 of the test system 300 (both of FIG. 3). Alternatively, the algorithm 600 can execute on a computer that is used to control the operation of a test system, a custom designed integrated circuit, and so forth.

The testing of a UUT can begin with the controller using a mechanical actuator to move the UUT into position in the test system (block 605). Alternatively, a test operator can place the UUT into position in the test system. With the UUT in place in the test system, the controller can load a test pattern into the UUT (block 610). The test pattern may be one out of many that will be used to test the UUT or only a single test pattern may be used. After loading the test pattern, the controller can set the timing of the short duration light pulse from the pulsed laser (block 615). For example, the controller can set when the short duration light pulse is to be emitted, the duration of the light pulse, and so forth. As discussed above, if the pulsed laser is set to emit after the light modulators of the UUT are given a command to change state and before the change of state is complete, it is possible to capture the dynamic behavior of the light modulators. If the pulsed laser is set to emit after the light modulators have completed (or before) the change of state, then the static behavior of the light modulators can be captured.

With the pulsed laser configured and the UUT programmed, the test can commence (block 620). Once the test is complete, the results of the test (the correlation image) can be saved or reviewed (block 625). The test results can be reviewed to determine the performance of the UUT. The results from the various tests and test patterns can be combined to determine if the UUT passes or fails. If additional light pulse timings are needed, then the controller can return to block 615 to repeat the test (block 630). If additional test patterns are to be tested, then the controller can return to block 610 to repeat the test (block 635). Else, the testing for the UUT is complete.

Figure 7A:
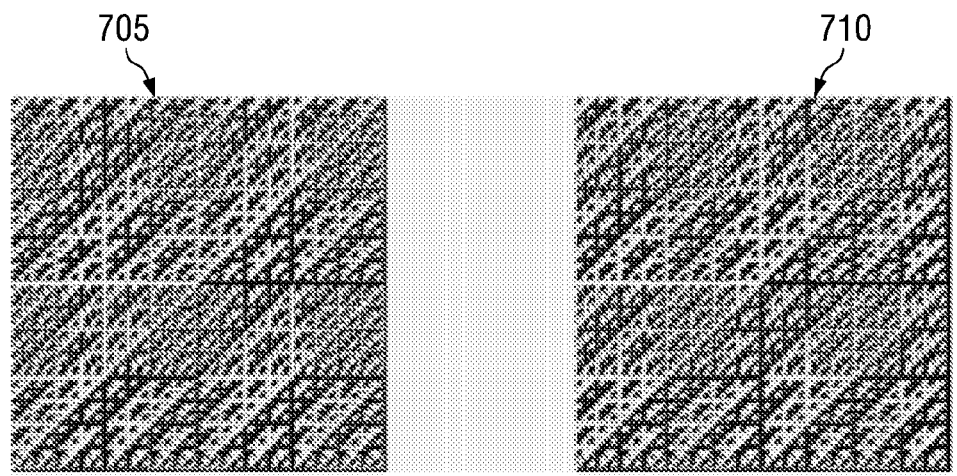
FIGS. 7a and 7b are diagrams of an exemplary test pattern produced by an SLM and a correlation image of the exemplary test pattern, wherein the SLM exhibits very good performance, according to a preferred embodiment of the present invention.
Figure 7B:
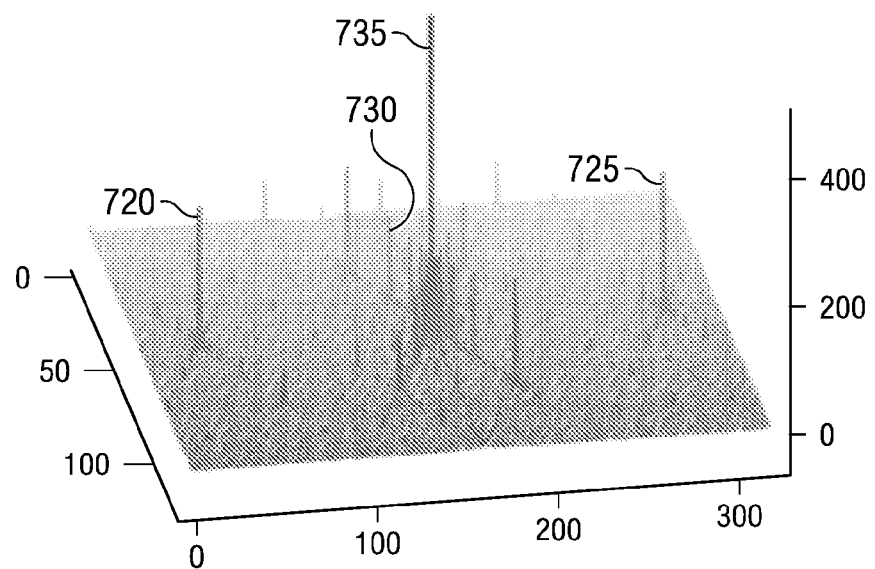

With reference now to FIGS. 7a and 7b, there are shown diagrams illustrating an exemplary test pattern produced by a UUT, wherein the UUT exhibits very good performance, and a correlation image of the exemplary test pattern, according to a preferred embodiment of the present invention. As shown in FIG. 7a, the UUT is configured to display an exemplary test pattern in two display areas, a first area 705 and a second area 710. The exemplary test pattern displayed by the UUT is known as a Hadamard pattern. As shown in FIG. 7b, the correlation image shows that there is excellent correlation between the test patterns in the first area 705 and the second area 710. This is shown by two large correlation spikes 720 and 725. The higher the correlation spikes 720 and 725, the better the correlation between the images in the two areas. Additionally, the large magnitude of spikes, such as spike 730, around a central correlation spike 735 indicates that there is a good match between the images in the two areas. The spike 735 is representative of correlation about the zero frequency (DC) and does not convey significant information.

Figure 8A:
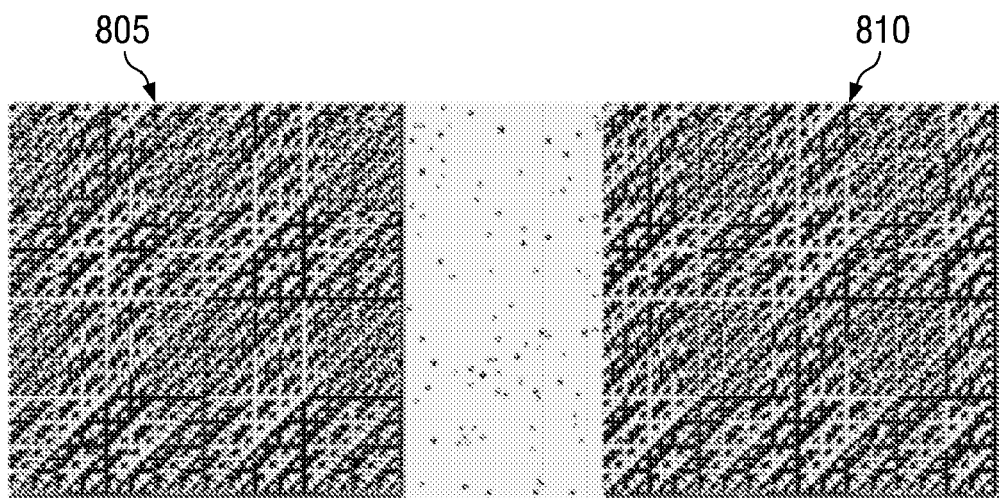
FIGS. 8a and 8b are diagrams of an exemplary test pattern produced by an SLM and a correlation image of the exemplary test pattern, wherein the SLM exhibits good performance, according to a preferred embodiment of the present invention.
Figure 8B:
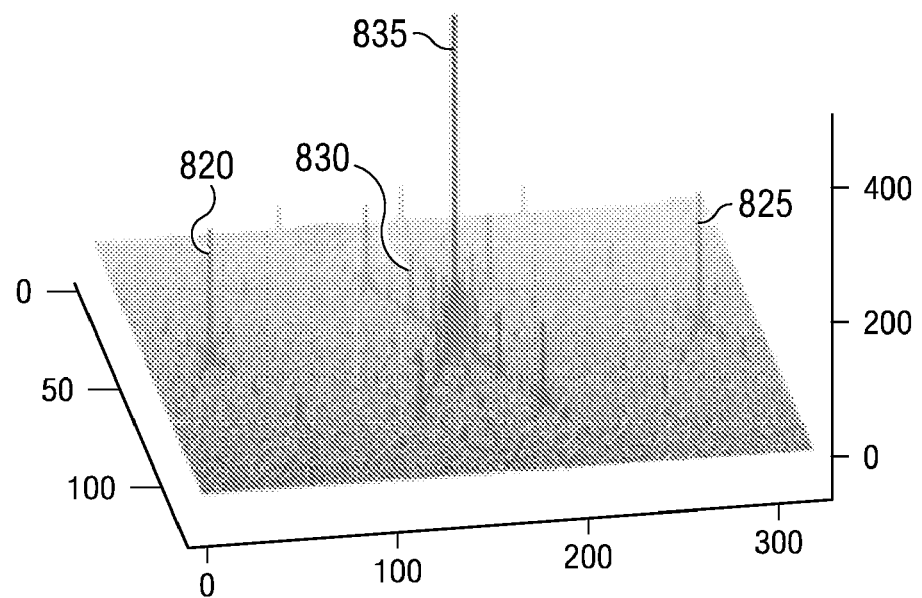

With reference now to FIGS. 8a and 8b, there are shown diagrams illustrating an exemplary test pattern produced by a UUT, wherein the UUT exhibits good performance, and a correlation image of the exemplary test pattern, according to a preferred embodiment of the present invention. The diagram shown in FIG. 8a illustrates the exemplary test pattern repeated in two areas of the UUT, a first area 805 and a second area 810. In this case, the UUT has some light modulators that are not operating properly. This manifests itself as specks in the diagram shown in FIG. 8a. The more specks present in the diagram, the worse the performance of the UUT. The diagram shown in FIG. 8b illustrates the correlation image and shows that correlation spikes 820 and 825 have a smaller magnitude than the correlation spikes 720 and 725 (FIG. 7b). Furthermore, the magnitude of spikes, such as spike 830, around a central correlation spike 835, is also smaller. Note that the central correlation spike 835 has approximately the same magnitude as the central correlation spike 735 (FIG. 7b). The difference in the magnitudes of the correlation spikes 820 and 825, along with the magnitudes of the spikes around the central correlation spike 835, such as spike 830, can be used to determine the performance of the UUT. If the magnitudes are below a certain threshold lower than a reference unit, then the UUT may be deemed as having failed the test, for example.

Figure 9A:
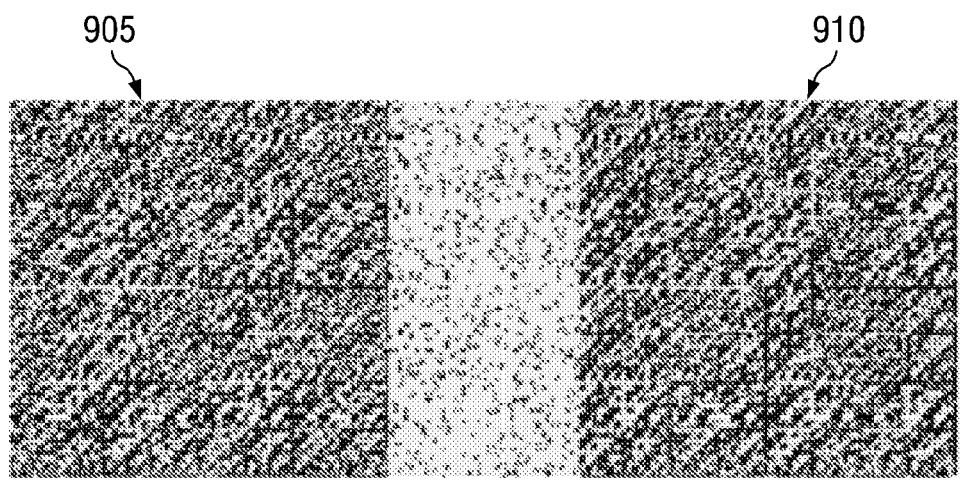
FIGS. 9a and 9b are diagrams of an exemplary test pattern produced by an SLM and a correlation image of the exemplary test pattern, wherein the SLM exhibits poor performance, according to a preferred embodiment of the present invention.
Figure 9B:
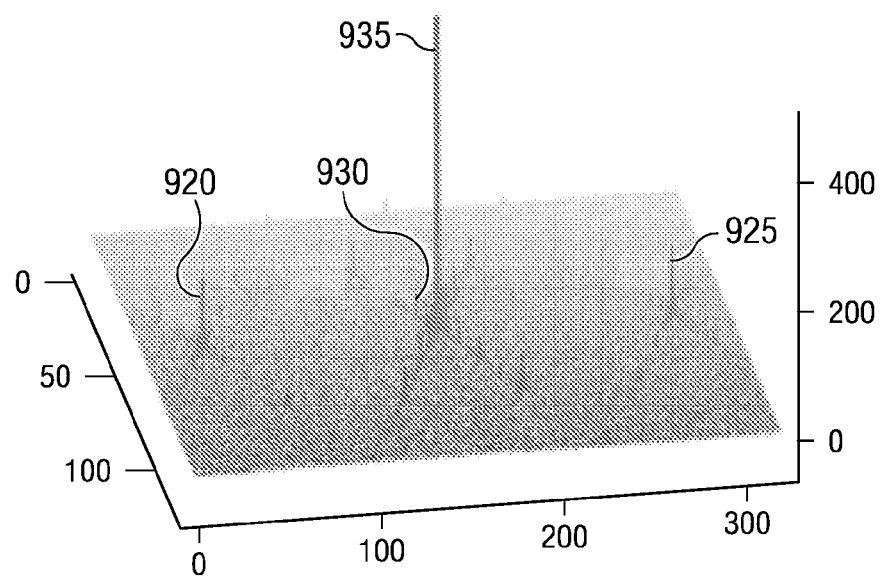

With reference now to FIGS. 9a and 9b, there are shown diagrams illustrating an exemplary test pattern produced by a UUT, wherein the UUT exhibits poor performance, and a correlation image of the exemplary test pattern, according to a preferred embodiment of the present invention. The diagram shown in FIG. 9a illustrates the exemplary test pattern repeated in two areas of the UUT, a first area 905 and a second area 910. In this case, the UUT has a significant number of light modulators that are not operating properly. The diagram shown in FIG. 9b illustrates the correlation image and shows that correlation spikes 920 and 925 have a significantly smaller magnitude than the correlation spikes 720 and 725 (FIG. 7b) and 820 and 825 (FIG. 8b). Furthermore, the magnitude of spikes, such as spike 930, around a central correlation spike 935, is also significantly smaller. Note that the central correlation spike 935 has approximately the same magnitude as the central correlation spike 735 (FIG. 7b) and 835 (FIG. 8b).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining the performance of a spatial light modulator, the method comprising:
   instructing light modulators in the spatial light modulator to assume a specified state;
   emitting a short duration light pulse at a specified time;
   computing a correlation image based upon light reflected from the light modulators in the spatial light modulator; and
   evaluating the correlation image to determine the performance.

2. The method of claim 1 further comprising prior to the emitting, configuring a pulsed light source to emit the short duration light pulse at the specified time.

3. The method of claim 1, wherein the computing comprises:
   converting an image representing the light reflected from the light modulators into a spatial frequency domain representation;
   computing a magnitude of the spatial frequency domain representation of the image;
   computing a square-root of the magnitude of the spatial frequency domain representation of the image; and
   converting the square-root of the magnitude of the spatial frequency domain representation of the image into a spatial domain representation.

4. The method of claim 3, wherein the converting into the spatial frequency domain is performed by an optical computational unit.

5. The method of claim 4, wherein the optical computational unit is a lens.

6. The method of claim 5, wherein the pulsed light source is produced by a pulsed laser.

7. The method of claim 3, wherein the computing of the correlation image is performed by optical computational units, and wherein the converting into the spatial frequency domain is performed by a second lens, the computing of the magnitude and the computing of the square-root is performed by a charge-coupled device, and the converting into the spatial domain is performed by a third lens.

8. The method of claim 7, wherein the light source and a display converts electrical information provided by the charge-coupled device back into optical information, and wherein the light source is a laser.

9. The method of claim 7 further comprising after the converting of the square-root, converting the spatial domain representation of the square-root of the magnitude of the spatial frequency domain representation of the image into electrical signals.

10. The method of claim 1, wherein the correlation image provides a comparison of an image comprising the light reflected from the light modulators in the spatial light modulator with an image from a reference unit.

11. The method of claim 1, wherein the correlation image provides a comparison of a first image comprising the light reflected from the light modulators in a first portion of the spatial light modulator with a second image comprising the light reflected from the light modulators in a second portion of the spatial light modulator.

12. A method for testing the performance of a spatial light modulator, the method comprising:
   providing a test pattern to the spatial light modulator;
   configuring a pulsed light source to emit a short duration light pulse at a specified time;
   instructing the spatial light modulator to display the test pattern;
   emitting the short duration light pulse at the specified time;
   computing a correlation image based upon light reflected by the spatial light modulator; and
   determining the performance based upon the correlation image.

13. The method of claim 12, wherein the configuring, instructing, emitting, and computing is repeated for a plurality of specified times.

14. The method of claim 13, wherein the plurality of specified times span a time required by light modulators in the spatial light modulator to change state.

15. The method of claim 12, wherein the providing, configuring, instructing, emitting, and computing is repeated for a plurality of test patterns.

16. The method of claim 12, wherein the computing comprises:
   converting an image representing the light reflected from the light modulators into a spatial frequency domain representation;
   computing a magnitude of the spatial frequency domain representation of the image;
   computing a square-root of the magnitude of the spatial frequency domain representation of the image; and
   converting the square-root of the magnitude of the spatial frequency domain representation of the image into a spatial domain representation.

17. The method of claim 16, wherein the computing of the correlation image is performed by optical computational units, and wherein the converting into the spatial frequency domain is performed by a second lens, the computing of the magnitude and the computing of the square-root is performed by a charge-coupled device, and the converting into the spatial domain is performed by a third lens.

18. The method of claim 17, wherein the light source and a display converts electrical information provided by the charge-coupled device back into optical information, and wherein the light source is a laser.

19. The method of claim 12, wherein the pulsed light source is a pulsed laser.

20. A system for testing spatial light modulators, the system comprising:
   a pulsed light source configured to emit a short duration coherent light pulse at a specified time onto a unit under test (UUT);
   a lens located a first fixed distance away from the UUT, the lens configured to convert an image formed from light reflecting from the UUT into a spatial frequency domain representation of the image;
   a sensor located a second fixed distance away from the lens, the sensor configured to convert the spatial frequency domain representation of the image into electrical signals; and
   a computational unit coupled to the sensor, the computational unit configured to compute a magnitude and a square-root of the electrical signals provided by the sensor.

21. The system of claim 20, wherein the computational unit is further configured to convert the magnitude and the square-root of the electrical signals provided by the sensor into a spatial domain representation.

22. The system of claim 21, wherein the computation unit comprises:
   a display coupled to the sensor, the display being configured to convert the electrical signals into a second image;
   a second lens located a third fixed distance from the display, the second lens being configured to convert a projection of the second image into a spatial domain representation.

23. The system of claim 22 further comprising a second sensor located a fourth fixed distance away from the second lens, the second sensor being configured to convert the spatial domain representation of the projected image into electrical signals.

* * * * *